United States Patent [19]

George et al.

[11] Patent Number: 4,782,546
[45] Date of Patent: Nov. 8, 1988

[54] TAPE REPAIR APPARATUS

[76] Inventors: Leroy George, 7915 W. Orangewood, Glendale, Ariz. 85301; Wiley H. Voyles, 15627 W. Grand Ave., Surprise, Ariz. 85374

[21] Appl. No.: 59,413

[22] Filed: Jun. 8, 1987

[51] Int. Cl.⁴ .................... B08B 11/02; B31F 5/06; G03D 15/04
[52] U.S. Cl. .................. 15/100; 15/97 R; 15/102; 156/502
[58] Field of Search .............. 15/100, 102, 77, 97 R, 15/256.5; 360/137; 134/9; 29/402.09, 402.01, 402.11, DIG. 28; 242/58.1, 58.5; 156/159, 502, 505

[56] References Cited

U.S. PATENT DOCUMENTS 4,637,088  1/1987  Badaracco et al. ............ 15/97 R
4,698,119 10/1987  Easterling .................... 156/502 X

*Primary Examiner*—Edward L. Roberts
*Attorney, Agent, or Firm*—Gregory J. Nelson

[57] ABSTRACT

A tape repair device for reviewing and repairing audio and video cassettes having a housing with a tray for receiving cassettes and drive means for advancing or rewinding the tape within the cassette. A roller serves as a tape extractor and engages the tape and is actuable to move the tape to an extracted position away from the cassette convenient for effecting repairs. The unit may also include a tape splicer bar and auxiliary cleaning roller which engages the tape.

4 Claims, 2 Drawing Sheets

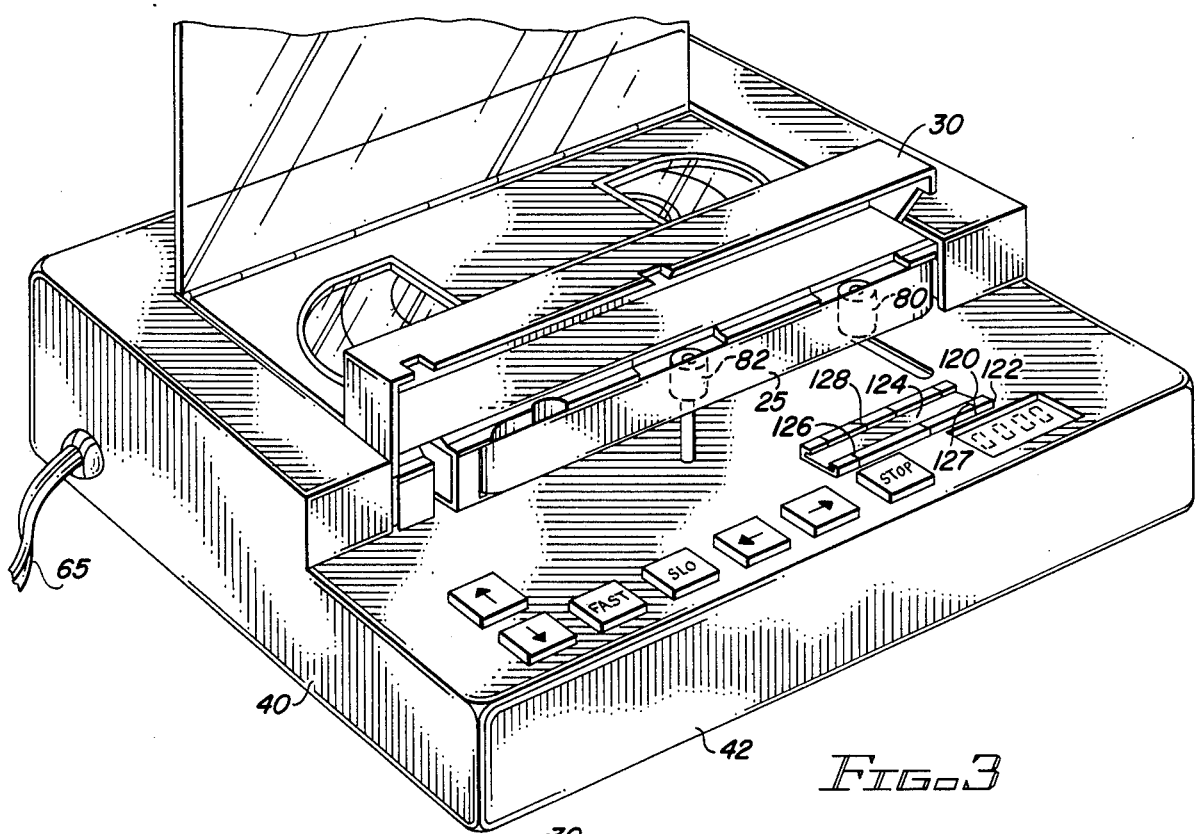
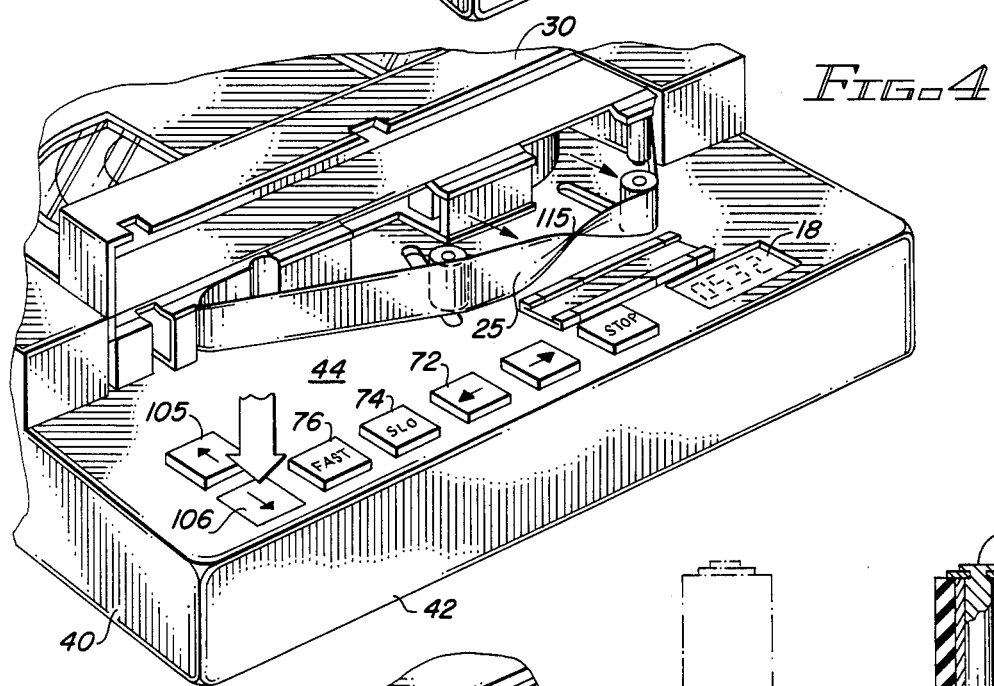
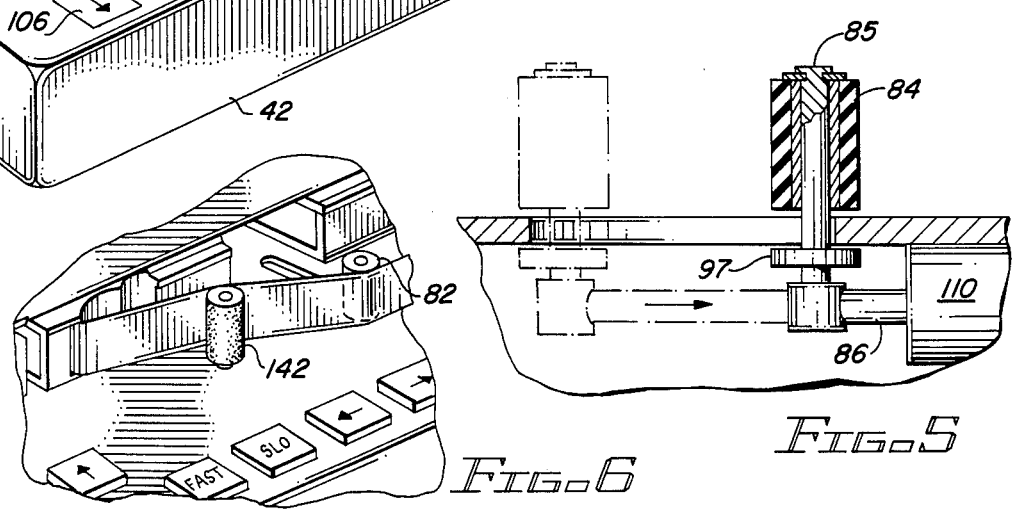
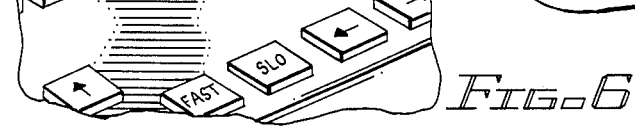

TAPE REPAIR APPARATUS

The present invention relates to a tape repair apparatus and more particularly relates to a device which permits the user to quickly advance an audio or video tape to a particular location for repair of the tape.

Audio and video tapes are conventionally housed or packaged within a plastic cartridge or cassette which contains two reels rotatably mounted on a spool which engages a spindle on the tape machine. One end of the tape is connected to one of the reels and the opposite end connected to the other so that the tape may be wound in one direction for play and in the opposite direction for re-winding. It is not uncommon for tapes of this type to become twisted within the cassette during the play or re-winding operation or for a break to occur in the tape. In this event, the user must ordinarily repair the tape by manually advancing the tape to the location which requires repair. One reel of the cartridge must be wound to take up the tape as the tape is unwound from the opposite reel. This is usually done manually by inserting a pencil or other instrument into the spool of the reel. Obviously, this operation is laborious, time-consuming and can be extremely frustrating for the repair person who often ends up with many feet of unraveled tape.

In view of this, there exists a need for an effective apparatus which would allow the user to quickly advance a tape housed within a cassette to a particular location and which would extract a portion of the tape adjacent the repair location from the cassette to facilitate repair.

Briefly, the present invention provides a tape repair apparatus having a housing defining a receptacle to receive the tape cassette. A pair of spindles are adapted to operatively engage the tape reels within the cassette. The spindles are driven by reversing motors so that the tape within the cassette may be advanced or re-wound at the selection of the user. One or more rollers engage an exposed portion of the tape and upon actuation, advance in a direction generally perpendicular to the tape to withdraw or extract a section of the tape from the cassette housing. The withdrawn section of the tape can then be reviewed by the user and the appropriate splice or other repair can be made. In the preferred embodiment of the invention, a splicing bar is provided on the working surface as well as a cleaning roller which engages the tape when the extension roller is actuated. The repair unit includes appropriate controls for controlling the operation of the motor in either direction at a fast or slow speed. A counter may also be provided for the convenience of the user.

The above and other objects and advantages of the present invention will be more fully understood from the following description, claims and drawings in which:

FIG. 3 is a perspective view of the tape repair unit of the present invention with a video tape cartridge in position in the unit;

FIG. 4 is a perspective view similar to FIG. 3 with the tape-engaging rollers in an extended position with a segment of the tape extended for repair;

FIG. 5 is a detail view illustrating the retracted and extended position of the tape roller; and FIG. 6 is a detail view illustrating the cleaning roller.

Figure 2:
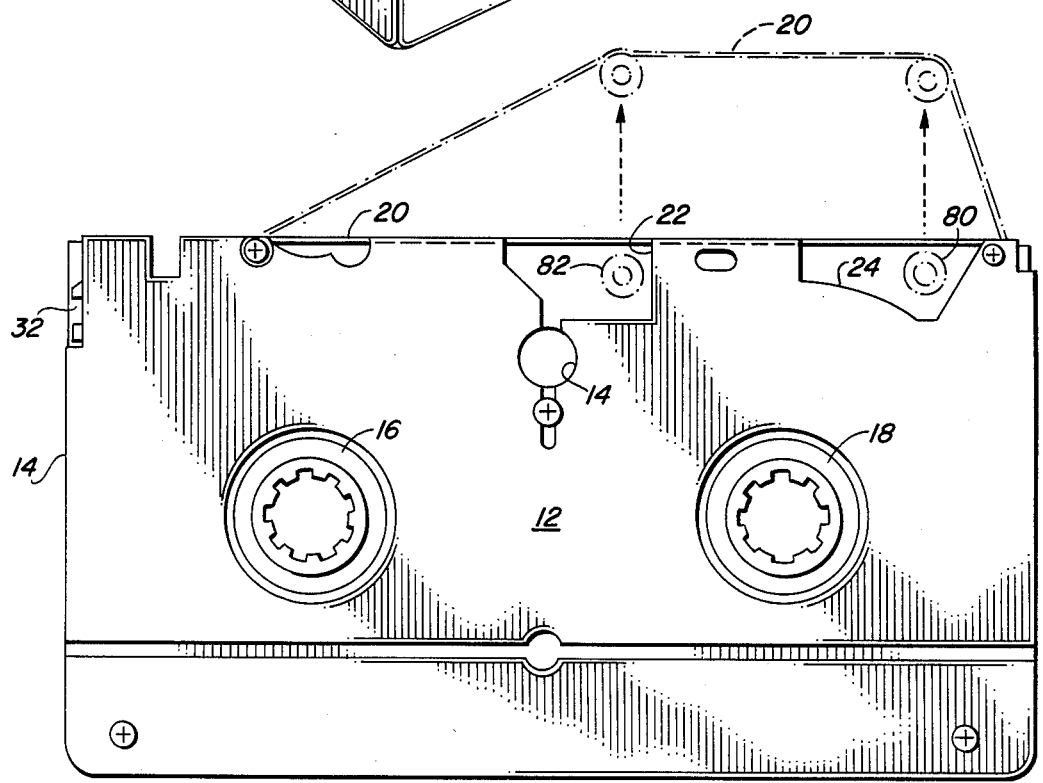
FIG. 2 is a bottom view of a conventional video cassette tape within the cartridge with the extending position of the tape being shown in dotted lines.

Turning now to the drawings, the tape repair unit of the present invention is generally designated by the numeral 10 which is adapted to receive cassettes or cartridges 12 as shown in FIG. 2. Cassette or cartridge 12 is of a conventional type and has a generally rectangular housing 14 which supports a pair of reels 16 and 18 each mounted on spools 19 which have teeth which are engageable by spindles. The opposite ends of tape 20 are attached to the reels. One or more sections of the tape 20 are exposed at recesses 22 and 24 in the cartridge so the tape may be engaged with heads for picking up the electromagnetic impulses on the tape. The present invention has application to both audio and visual cassettes although for purposes of explanation, reference will be made to a conventional video-type tape such as that of the VHS or Beta format. In such instances, the tape cassette normally includes a cover 30 as best seen in FIG. 3 which may be unlocked and pivoted to an open position exposing a longitudinally extending section or segment 25 of the tape. The cover 30 is released by latch 32 which conventionally is provided on the side of the cartridge as seen in FIG. 2.

The tape repair unit has opposite side walls 40 and 41, front wall 42 and rear wall 43. A generally horizontally extending panel 44 extends between the side walls and forward portion of the panel 44 defines a working surface. The rear portion of panel 44 defines a tape-receiving section 46 to facilitate insertion of tapes. A tape receptacle or tray 48 is pivotally mounted between the opposite side walls 40 and 41. The tape tray is generally C-shaped having a back wall 50, a lower forwardly extending lip 52 and a cover plate 54. The configuration of the tray allows insertion of the cartridge with the back edge of the cartridge engaging the wall 50 so that the tape is exposed to the user. Preferably cover plate 54 is transparent so that the tape may be viewed by the user through the cover 54.

A pair of drive spindles 60, 62 extend vertically within the tape-receiving section 46 and are positioned to engage the teeth 16, 17 and 18. Preferably the spindles 60, 62 have radially extending projections 64 that engage the teeth in the spindles for positively driving the reels in one direction or other other.

As is well known in the art, the spindles are driven by reversible electric motors so that the tape can be advanced in one direction and re-wound in the other at the selection of the user. Since these drive systems are well known in the art, detailed description is not believed necessary. The motors may be A.C. motors or may be D.C. motors in which case the power supplied by the power cord 65 would be rectified into D.C. current.

The rotational direction of the spindles 62, 64 is controlled by switches 70, 72. The relative speed of operation of the spindles is controlled by switches 74 and 76. A stop switch 75 will stop the tape at any desired location. A conventional counter 78 is also provided on control panel 44 for the convenience of the user.

The tape within the cassette is extracted or removed to a position convenient for repair by tape extractor roller assemblies 80 and 82 which extend perpendicularly from panel 44 and in the retracted position align with recesses 22 and 24. As seen in FIG. 5, the roller assemblies each have a generally cylindrical roller member 84 rotative about a shaft 85. The lower end of shaft 85 is secured at the outer end of actuator arm 87.

Figure 1:
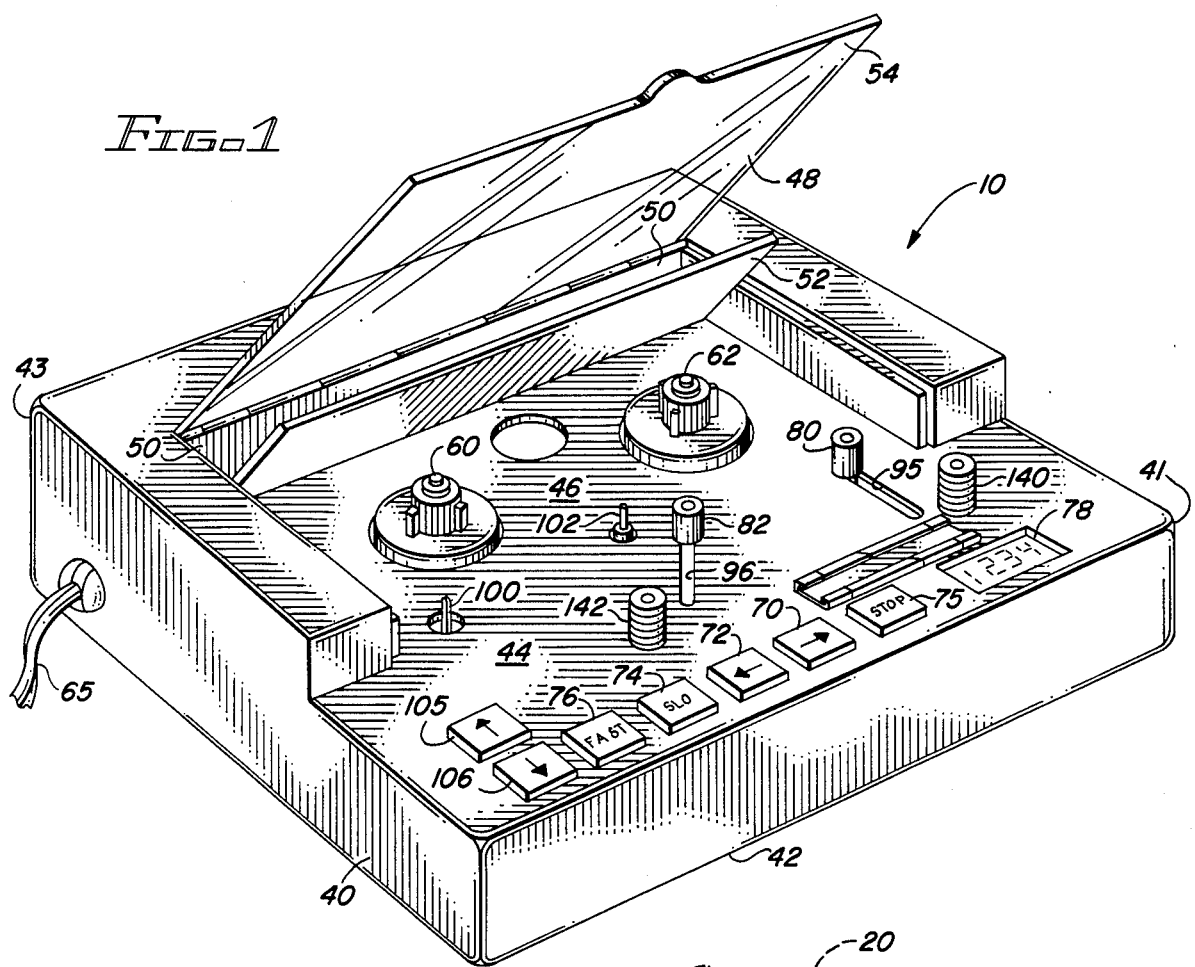
FIG. 1 is a perspective view of the tape repair unit of the present invention.

Roller assembly 80 is movable from a retracted position as shown in FIG. 1 to an extended position as shown in FIG. 4 along slot 95. A guide member 97 is provided at the underside of panel 44. Similarly, roller 82 is movable from a retracted position as shown in FIG. 1 to an extended position along slot 96 as shown in FIG. 4. Slot 95 is generally perpendicular with respect to tape segment 25 whereas slot 95 is angularly disposed. In the extended position, the roller assemblies engage the inner side of tape segment 25 and when actuated move the tape to an extracted position convenient for the user to make the appropriate repair.

Latch pin 100 extends vertically from panel 44 and is adapted to align with latch 32 on the cassette 12. Thus, when the cassette 12 is placed in tray 48 and the tray pivoted to the closed position with the spindles 60, 62 engaging the apertures in the reels, the pin 100 will engage latch 32 allowing cover 30 to release to the position shown in FIG. 3. Pin 102 serves to engage aperture 19 to release the reels. When cover 30 is open, a segment 25 of tape 20 extending longitudinally along the edge of the cassette is exposed. In this position, it will be noted that roller 80 is aligned with recess 24 in the cassette and similarly, roller 82 is aligned with recess 22 at the inner face of the tape section 25. Control members 105 and 106 control the operation of solenoids 110 which are connected through an actuator arm 87 to rollers 80 and 82. Upon depression of control member 106, the actuator members 86 extend outwardly under the actuation of the solenoids 110 moving rollers 80 and 82 forwardly in their respective slots 95 and 96. Since the rollers are positioned at the inside face of the tape, the tape is extended or extracted from the cassette as shown in FIG. 4. In the extended or extracted position, the tape is convenient to the operator or user for repair and selective operation of the control members 70, 72, 74, 76 and 75, will allow the user to advance the tape to the desired location where a problem 115 exists. The operator can then work to correct the problem by untwisting the tape or removing a section of tape and splicing the tape, if necessary.

To facilitate splicing operations, a horizontal splicing bar 120 may be provided on panel 44 at a location adjacent the extended position of rollers 80 and 82. As best seen in FIGS. 1, 3 and 4, the splice bar consists of a generally horizontal body having longitudinally extending edges 122 defining a longitudinally extending channel 124 which has a width closely approximating the width of the tape section 20. Transverse slots 126 and 127 are provided in edge sections 122 adjacent the opposite ends of the bar. Similarly, angular slots 128 are provided at an intermediate point which are angularly disposed with respect to the opposite edges of the bar. These slots accomodate a cutting tool and thus the tape may be placed in the central channel of the bar and cut either transversely or angularly with respect to the sides of the tape for splicing purposes. Tape or other adhesive as is conventionally used may be used to join the severed end sections to complete the splicing operation.

An added feature of the present invention is the provision of auxiliary cleaning members for cleaning the tape surfaces. To this end, a pair of cleaning members 140 and 142 are provided adjacent rollers 82 and 80, respectively. These cleaning members are mounted adjacent the rollers 80 and 82 in the extended position so that the tape passes between the roller 80 and the cleaning member 140 and roller 82 and cleaning members 142 when the tape is moved to the extended or extracted position. Cleaning members 140 each have a generally cylindrical outer surface which is felt or similar material rotatively mounted on a vertically extending spindle shaft. As is known, a cleaning solution can be applied to the felt-like outer surface to assist in cleaning the tape as the tape passes in engagement with the surface of the cleaner.

A more complete understanding of the present invention will be had from the following description of operation. Again, the description of operation is with respect to the device used as a unit for repairing and cleaning video tape cassettes. A video tape cassette such as a standard VHS cassette is placed in the tape tray or receptacle 48 with the cover 30 facing outwardly. The cover is manually pivoted downwardly and the control switch 106 actuated to move the rollers 80, 82 outwardly. Once the cassette is in position with the tray receptacle 48 in the down position, pin 100 will unlatch cover 30 and pin 102 will unlock the reels in the cassette. Rollers 80 and 82 are received within apertures 22 and 24 in the cartridge so that they are positioned at the inner face of the tape 20.

Upon actuation of switch 106, rollers 80 and 82 move outwardly in their slots causing the tape to be extracted or moved outwardly assuming the position shown in FIG. 4 with a segment 25 of the tape away from the cassette. This movement also serves to bring the tape into contact with cleaning rollers 140 and 142 which may be treated with a suitable fluid cleaner which is applied to the tape as the tape moves past these surfaces.

The operator can then manipulate the appropriate control buttons, 70, 72, 74, 75 and 76, to cause the tape section 115 in need of repair to be brought into position intermediate rollers 80 and 82. The appropriate repair, that is untwisting of tape and splicing if necessary, can then be accomplished. Splicing is facilitated by placing the tape within the channel 120 of the tape splicer and removing the appropriate section, thereafter adhesively joining the severed sections together as is known in the art. The counter 78 assists the user in locating the appropriate problem area on the tape.

When the repair operation is completed, the rollers 80 and 82 may be retracted to the position shown in FIGS. 3 and the tape may be re-wound to a position ready for use.

It is also within the scope of the present invention to provide release means as are well known in the art so that in the event the tape drive is left in an actuated position in either the forward or re-wind positions, the drive spindles 62 and 64 will be stopped when the end of the tape is reached. This can be accomplished several ways. One conventional way is the use of an optical device which "reads" the transparent section of the tape at either end of the tape where the tape attaches to the spools. When the optical device reads a clear section, the unit is switched to an "off" position.

From the foregoing, it will be seen that the present invention provides an effective and simple device for affecting repairs to damage audio and video tapes. These tapes are expensive and the present invention will allow the owner to salvage tapes which otherwise would be discarded. The apparatus is usable by individuals and also commercial users such as video stores who often encounter problems with renters returning tapes in damaged condition. The device is simple to use and effective for its intended purpose.

It will be obvious to those skilled in the art to make various changes, alterations and modifications to the invention described herein. To the extend that these various alterations, modifications and changes do not depart from the spirit and scope of the appended claims, they are intended to be encompassed therein.

We claim:

1. An apparatus for repair of audio and video tapes of the type contained within a cartridge having spaced-apart reels for winding the tape in a forward or reverse direction, said apparatus comprising:
   (a) a housing defining a compartment for securing said tape cartridge;
   (b) drive means engaging said reels for selectively driving said tape in a forward or reverse direction;
   (c) tape extractor means including at least a pair of spaced-apart roller means having a first position engageable with said tape when said cartridge is in said compartment; and
   (d) actuator means for selectively moving said tape extractor means to a second position maintaining at least a segment of said tape extending between said rollers spaced away from said cartridge in a position convenient for repair and review of the tape.

2. The apparatus of claim 1 wherein said tape is a video tape and said cartridge includes a door having a latched and unlatched position and wherein said compartment includes unlatching means for moving said door to an unlatched position.

3. The apparatus of claim 1 further including a splicer bar located adjacent said rollers in said second position.

4. The apparatus of claim 1 further including tape cleaning means having a cleaning surface engageable with said tape in said extended position.

* * * * *